(12) United States Patent
Barradas et al.

(10) Patent No.: US 9,327,273 B2
(45) Date of Patent: May 3, 2016

(54) CATALYSTS

(75) Inventors: Sean Barradas, Koppieskraal (ZA);
Jacobus Lucas Visagie, Sasolburg (ZA);
Lesibana Peter Ledwaba, Piet Retief (ZA); Dirk Niemeyer, Brunsbuettel (DE)

(73) Assignee: SASOL TECHNOLOGY (PROPRIETARY) LIMITED, Johannesburg (ZA)

( * ) Notice: Subject to any disclaimer, the term of this patent is extended or adjusted under 35 U.S.C. 154(b) by 306 days.

(21) Appl. No.: 13/983,721

(22) PCT Filed: Jan. 5, 2012

(86) PCT No.: PCT/IB2012/050057
§ 371 (c)(1),
(2), (4) Date: Aug. 5, 2013

(87) PCT Pub. No.: WO2012/107844
PCT Pub. Date: Aug. 16, 2012

(65) Prior Publication Data
US 2013/0317264 A1    Nov. 28, 2013

(30) Foreign Application Priority Data
Feb. 9, 2011  (ZA) .................................. 2011/01054

(51) Int. Cl.
| | | |
|---|---|---|
| *B01J 21/04* | (2006.01) | |
| *B01J 21/10* | (2006.01) | |
| *B01J 23/74* | (2006.01) | |
| *B01J 23/75* | (2006.01) | |
| *B01J 23/755* | (2006.01) | |
| *B01J 37/02* | (2006.01) | |
| *B01J 37/16* | (2006.01) | |
| *B01J 37/18* | (2006.01) | |
| *B01J 23/89* | (2006.01) | |
| *B01J 21/08* | (2006.01) | |
| *B01J 23/888* | (2006.01) | |
| *B01J 37/08* | (2006.01) | |
| *C10G 2/00* | (2006.01) | |

(52) U.S. Cl.
CPC .............. *B01J 23/8993* (2013.01); *B01J 21/08* (2013.01); *B01J 23/888* (2013.01); *B01J 37/08* (2013.01); *C10G 2/33* (2013.01)

(58) Field of Classification Search
CPC ........ B01J 21/04; B01J 21/063; B01J 21/066; B01J 21/08; B01J 21/10; B01J 23/74; B01J 23/748; B01J 23/75; B01J 23/755; B01J 23/888; B01J 23/8993; B01J 37/02; B01J 37/08; B01J 37/16; B01J 37/18; C10G 2/33; C10G 2/332
USPC .......... 502/305, 307, 309, 313–316; 518/715, 518/719
See application file for complete search history.

(56) References Cited

U.S. PATENT DOCUMENTS

| | | | | |
|---|---|---|---|---|
| 4,210,597 A | * | 7/1980 | Huang ................. | H01J 23/6527 502/313 |
| 4,272,410 A | * | 6/1981 | Huang ................. | B01J 23/6527 502/313 |
| 5,510,309 A | * | 4/1996 | Chang ....................... | B01J 23/30 208/46 |
| 6,822,008 B2 | * | 11/2004 | Srinivasan ............... | B01J 23/40 518/715 |
| 7,365,040 B2 | | 4/2008 | Van Berge et al. | |
| 2010/0197959 A1 | * | 8/2010 | Johnston ................. | C07C 67/00 560/265 |
| 2013/0178662 A1 | * | 7/2013 | Zhou .................... | B01J 37/0205 568/885 |
| 2013/0178663 A1 | * | 7/2013 | Zhou .................... | B01J 37/0205 568/885 |

FOREIGN PATENT DOCUMENTS

| | | |
|---|---|---|
| JP | 2004-073991 | 3/2004 |
| WO | 99/42214 | 8/1999 |
| WO | 2000/020116 | 4/2000 |
| WO | 2002/007883 | 1/2002 |
| WO | WO 02/07883 A2 | 1/2002 |
| WO | 2003/012008 | 2/2003 |
| WO | WO 2006/021366 A1 | 3/2006 |

OTHER PUBLICATIONS

WO2006021366 English Machine Translation from WIPO obtained online Jul. 24, 2015.*
Chan, et al., "Laser Raman Characteriziation of Tungsten Oxide Supported on Alumina: Influence of Calcination Temperatures", "Journal of Catalysts 92, 1-10 (1985)", 1985, Publisher: Academic Press, Inc.
Cichowlas, Andrezej, et al, "Fischer-Tropsch Synthesis Over Supported Tungsten Hexacarbonyl", Jan. 1984, pp. 353-356, vol. 11, Publisher: Applied Catalysts, Published in: US.
Stuart James Thomson, "Cobalt on Tungsten Modified Alumina Supports in Relation to Fischer-Tropsch Catalysis", Jan. 1, 1993, pp. 167, Publisher: Flinders University of South Australia, Discipline Chemistry, School of Physical Sciences, Thesis Submitted in Partial Fulfilment of an Honours Degree, Published in: Australia.
International Preliminary Report on Patentability for PCT/IB2012/050057, Filed Jan. 5, 2012.
International Search Report for PCT/IB2012/050057, Filed Jan. 5, 2012.

* cited by examiner

*Primary Examiner* — Patricia L Hailey
(74) *Attorney, Agent, or Firm* — Fellers, Snider, Blankenship, Bailey & Tippens, P.C.

(57) ABSTRACT

A method of preparing a catalyst precursor comprises contacting a catalyst support material with a tungsten compound, to obtain a tungsten-containing catalyst support material. The tungsten-containing catalyst support material is calcined at a temperature above 900° C. to obtain a modified catalyst support. A precursor compound of an active catalyst component is introduced onto and/or into the modified catalyst support thereby to obtain a catalyst precursor.

16 Claims, No Drawings

CATALYSTS

FIELD OF THE INVENTION

THIS INVENTION relates to catalysts. More particularly, it relates to a method of preparing a catalyst precursor, to a method of preparing a catalyst, and to a hydrocarbon synthesis process employing the catalyst.

BACKGROUND ART

Hydrocarbon synthesis from hydrogen and carbon monoxide in the presence of a Fischer-Tropsch catalyst is commonly known as Fischer-Tropsch (FT) synthesis. FT synthesis forms part of gas-to-liquids, coal-to-liquids, and biomass-to-liquids processes in which natural gas, coal, and biomass respectively are usually converted by means of a three step process into liquid hydrocarbons. The three process steps are normally (i) production of synthesis gas (or 'syngas') comprising a mixture of hydrogen and carbon monoxide from natural gas, coal, or biomass respectively, (ii) conversion of the syngas into a waxy hydrocarbons or syncrude by means of FT synthesis, and (iii) a hydrocracking or hydrotreating step to convert the waxy syncrude into liquid transportation fuels such as diesel, petrol, jet fuel, as well as naphtha.

During the FT synthesis described in step (ii) above the syngas in the form of CO and $H_2$ is contacted with a FT synthesis catalyst under FT synthesis conditions to produce the waxy hydrocarbons. One type of catalyst which is often used in low temperature FT (LTFT) synthesis comprises an active catalyst component such as Co on a catalyst support such as alumina, silica, titania, magnesia or the like.

Contamination of the waxy hydrocarbon product produced during FT synthesis with ultra fine particulate matter derived from the support such as alumina, and the active catalyst component such as Co, is experienced. This results in loss of the expensive active catalyst component as well as fouling of the downstream processes described in (iii) above with the support and active catalyst component ultra fine particles. It is believed that this wax product contamination is as a result of one or both of: (a) Catalyst support dissolution during aqueous impregnation of the catalyst support with the active catalyst component (during preparation of the catalyst) which may result in precipitation and coating of the bulk support material with a physically bonded amorphous layer of the support material whereon the active catalyst component is deposited. This amorphous layer is insufficiently anchored and results in dislodgement of and washing out of active catalyst component rich ultra fine particles during FT synthesis; and (b) The FT synthesis catalyst is susceptible to hydrothermal attack that is inherent to realistic FT synthesis conditions. Such a hydrothermal attack on exposed and unprotected support material will result in contamination of the waxy hydrocarbon product with ultra fine particular matter rich in the active catalyst component.

WO 99/42214, WO 02/07883, WO 03/012008 and U.S. Pat. No. 7,365,040 all disclose modification of a FT synthesis catalyst support with a modifying component to reduce the dissolution of the catalyst support in aqueous environment, including hydrothermal attack thereby to reduce the negative effect of ultra fine particles rich in active catalyst component contaminating the waxy hydrocarbon product. These documents focus on Si as a modifying component, but a large number of other modifying components such as Zr, Ti, Cu, Zn, Mn, Ba, Co, Ni, Na, K, Ca, Sn, Cr, Fe, Li, Tl, Mg, Sr, Ga, Sb, V, Hf, Th, Ce, Ge, U, Nb, Ta, W and La are also mentioned. The Journal of Catalysis 92, 1-10 (1985) discloses alumina modified with tungsten.

It has now surprisingly been found that when a catalyst support is modified with tungsten instead of silicon, solubility of the support is even further reduced. Even more surprising it has also been found that when the tungsten containing support is calcined at a temperature above 900° C., the solubility of a FT synthesis catalyst or support prepared from the tungsten modified support can be further reduced to even more acceptable levels. It was also unexpectedly found that, in at least some cases, the FT synthesis activity of the catalyst prepared from the tungsten modified support improved compared to a catalyst made from an unmodified support.

When a catalyst support is modified with Si, calcination of the silica containing support prior to impregnation with an active metal component, such as Co, takes place at a temperature of about 500° C. (see WO 99/42214 on page 15 line 9). This temperature is below the calcination temperature set by the invention, i.e. greater than 900° C. The inventors have thus found that when a silica modified support is calcined at temperatures higher than the normal calcination temperature of about 500° C. for calcining such modified supports, the solubility of the modified support calcined at the higher temperatures is higher than the solubility at about 500° C. It was accordingly most surprisingly found that when tungsten is used as a modifying component and the tungsten containing support is then calcined at the higher temperatures described above, the solubility of the tungsten modified catalyst support is reduced compared to the tungsten modified catalyst support calcined at lower temperatures.

DISCLOSURE OF THE INVENTION

According to a first aspect of the invention, there is provided a method of preparing a catalyst precursor, the method comprising contacting a catalyst support material with a tungsten compound, to obtain a tungsten-containing catalyst support material;

calcining the tungsten-containing catalyst support material at a temperature above 900° C. to obtain a modified catalyst support; and introducing a precursor compound of an active catalyst component onto and/or into the modified catalyst support thereby to obtain a catalyst precursor.

Preferably, the precursor compound is introduced into and/or onto the modified catalyst support after the catalyst support material has been contacted with the tungsten compound. More preferably, it is only introduced after said calcination of the tungsten-containing support material has taken place.

Contacting of the Catalyst Support Material With the Tungsten Compound

By contacting the catalyst support material with the tungsten compound, the tungsten compound may be introduced onto and/or into the catalyst support material.

In a preferred embodiment of the invention, the catalyst support material is at least partially soluble in an aqueous acid solution and/or in a neutral aqueous solution.

The catalyst support material may be selected from the group consisting of a catalyst support precursor which is convertible to a catalyst support upon calcination thereof; and a catalyst support.

When the catalyst support material is a catalyst support precursor, it may be a compound which, upon calcination, converts to a catalyst support in the form of an oxide, preferably a metal oxide. Preferably, the metal oxide is an oxide of a metal selected from the group consisting of Al, Si, Ti, Mg and Zn. More particularly, the catalyst support precursor may then comprise an aluminium compound which converts to one or more aluminium oxides upon calcination. Preferably, the aluminium compound is Al(OH)$_3$, such as gibbsite and/or bayerite and/or AlO(OH), and more preferably it is boehmite. The catalyst support precursor may be shaped into particulate form after the introduction of the tungsten compound onto and/or into the catalyst support precursor and before calcination thereof. The shaping may, for example, be carried out by means of spray drying. Prior to shaping the catalyst support precursor, it may be partially dried. The resulting shaped product may then be subject to the calcination above 900° C. The calcination preferably takes place prior to introducing the catalyst precursor compound onto and/or into the shaped product. In order to achieve a desired particle size distribution, classification may be performed on the shaped particulate product, using, for example, cyclones or sieves.

However, the catalyst support material is preferably a catalyst support. The catalyst support may then be any catalyst support suitable for supporting thereon the active catalyst component or a precursor compound of the active catalyst component. The catalyst support is preferably suitable for use as a support in a catalyst for synthesising hydrocarbons and/or oxygenates of hydrocarbons from at least hydrogen and carbon monoxide, particularly a Fischer-Tropsch (FT) synthesis catalyst. The FT synthesis catalyst may be for use in a process to be performed in a fixed bed reactor, slurry bed reactor or even a fixed fluidized bed reactor. Preferably, the process is to be performed in a three phase slurry bed FT synthesis reactor.

The catalyst support is usually a porous support, and preferably it is also preshaped. The porous support preferably has an average pore diameter from 8 to 50 nanometers, more preferably from 10 to 15 nanometers. The pre-shaped support may be a particulate support, preferably with an average particle size of from 1 to 500 micrometers, more preferably from 10 to 250 micrometers, and still more particularly from 45 to 200 micrometers.

The catalyst support may be selected from the group consisting of alumina in the form of one or more aluminium oxides; silica (SiO$_2$); titania (TiO$_2$); magnesia (MgO); zinc oxide (ZnO); and mixtures thereof. Preferably, the support is selected from the group consisting of alumina in the form of one or more aluminium oxides; titania (TiO$_2$) and silica (SiO$_2$). More preferably, the support is alumina in the form of one or more aluminium oxides.

The one or more aluminium oxides may be selected from the group including (preferably consisting of) gamma alumina, delta alumina, theta alumina and a mixture of two or more thereof. Preferably the group includes, or, more preferably, consists of, gamma alumina, delta alumina and a mixture of gamma alumina and delta alumina. The aluminium oxide catalyst support may be that obtainable under the trademark Puralox, preferably Puralox SCCa 150, from SASOL Germany GmbH. Puralox SCCa 150 is a spray-dried aluminium oxide support consisting of a mixture of gamma and delta aluminium oxide.

The aluminium oxide may be a crystalline compound which can be represented by the formula Al$_2$O$_3$.xH$_2$O where 0<x<1. The term 'aluminium oxide' thus excludes Al(OH)$_3$, and AlO(OH), but includes compounds such as gamma, delta and theta alumina.

In one embodiment of the invention, the tungsten compound may comprise a tungsten oxide. Preferably, the tungsten oxide includes one or more cations, preferably one or more cationic compounds. In one embodiment of the invention the tungsten compound may include either monotungstate ions [WO$_4$]$^{2-}$ or alternatively polyoxo tungstate ions (sometimes also named isopoly anions) such as metatungstate [W$_{12}$O$_{40}$]$^{4-}$ or paratungstate [W$_{12}$O$_{42}$]$^{6-}$, but also all other available forms. Suitable tungsten compounds are for example ammonium tungsten oxide hydrates such as ammonium metatungstate (NH$_4$)$_6$H$_2$W$_{12}$O$_{39}$.xH$_2$O or ammonium paratungstate (NH$_4$)$_{10}$(H$_2$W$_{12}$O$_{41}$).xH$_2$O.

It will be appreciated that, during the calcination of the tungsten-containing catalyst support material, the tungsten compound with which the catalyst support material is contacted, may react and be converted, i.e. it may decompose, and/or it may bond chemically to the catalyst support material; however, preferably, the calcination decomposes the tungsten compound to a tungsten oxide. Thus, when the initial tungsten compound is a tungsten oxide, such as ammonium metatungstate, it is typically converted to a decomposed tungsten oxide, particularly WO$_3$.

After calcination, the tungsten compound may be present in and on the catalyst support material in an amount of at least 0.4 wt %, preferably at least 0.8 wt %, more preferably at least 1.2 wt % W based on the total weight of the modified catalyst support. After calcination, the tungsten compound may be present in and on the catalyst support material in an amount of not more than 12 wt %, preferably not more than 8 wt %, more preferably not more than 4 wt % W based on the total weight of the modified catalyst support. The preferred amount of tungsten compound present in and on the catalyst support material is about 2.4 wt % W based on the total weight of the modified catalyst support.

The contacting of the catalyst support material with the tungsten compound may be by any suitable method including, for example, impregnation, precipitation or chemical vapour phase deposition. Preferably, the introduction of the tungsten compound into and/or onto the catalyst support material is by means of impregnation. A suitable impregnating liquid medium may be used to effect the contact between the tungsten compound and the catalyst support material. The impregnation may be incipient wetness impregnation, but preferably it is slurry phase impregnation. The liquid medium may be a non-aqueous medium, such as an organic liquid medium. However, preferably, the liquid medium is an inorganic liquid medium, preferably water. Preferably, the liquid medium is a solvent for the tungsten compound.

The impregnation by means of the liquid medium is preferably carried out at a pH above 4 and preferably below 10. The impregnation is preferably carried out at a temperature above 25° C. and preferably below 80° C. The temperature may be 50-60° C. The impregnation may be carried out for a period of at least 1 minute and preferably not more than 20 hours, preferably from 1 minute to 5 hours. The impregnation may be effected at atmospheric pressure.

After impregnation, the excess impregnation liquid medium may be removed, preferably by means of drying. The drying is preferably carried out at sub-atmospheric conditions, preferably at at least 0.01 bar(a), and preferably not at more than 0.1 bar(a). The drying is preferably carried out at temperature above 25° C., more preferably at or near the boiling point of the impregnating liquid medium.

During impregnation, sufficient impregnation liquid medium may be used to result in conditions of incipient wetness, alternatively, and preferably, in conditions of slurry impregnation.

Calcination of the Tungsten-Containing Support Material

The calcination of the tungsten-containing support material may take place in an oxidizing environment, such as in air. The calcination may be carried out either in a stationary or fluidized bed calciner. The calcination may instead take place in a rotary kiln. Most preferred, however, is a rotary kiln. The calcination may typically take place for a period of at least 10 min and preferably for not more than 10 hours. More preferably, the calcination may be effected for a period of about 20 min to 1 hour.

The method may also include a step of at least partially drying the tungsten-containing catalyst support material, preferably to remove an impregnation liquid medium used when the tungsten compound is impregnated into and/or onto the catalyst support material.

The calcination of the tungsten-containing support material is preferably carried out above 920° C., more preferably above 950° C., still more preferably above 1000° C.

The maximum calcination temperature is dictated by the resulting pore volume. The pore volume of the modified catalyst support should be above 0.1 ml/g, preferably above 0.2 ml/g, most preferably above 0.35 ml/g.

Different tungsten loadings have an influence on the catalyst support leaching behaviour. Therefore for each tungsten loading, the exact optimum calcination temperature within the claimed temperature range can be determined experimentally.

Introducing the Precursor Compound of an Active Catalyst Component, Onto and/or Into the Modified Catalyst Support The active catalyst component may be a known component active for hydrocarbon synthesis process (preferably a FT synthesis process), and may be selected from the group consisting of cobalt (Co), iron (Fe), nickel (Ni) and ruthenium (Ru). Cobalt (Co) is preferred.

The precursor compound may thus be any suitable compound of the active catalyst component. Preferably, it is an inorganic compound, more preferably an inorganic salt of the active catalyst component. The precursor compound may be cobalt nitrate, and particularly it may be $Co(NO_3)_2.6H_2O$.

The precursor compound may be introduced onto and/or into the modified catalyst support by any suitable manner, but preferably it is by means of impregnation. Preferably, the modified catalyst support is impregnated with the precursor compound by forming a mixture of the precursor compound; a liquid carrier for the precursor compound; and the modified catalyst support.

The liquid carrier may comprise a solvent for the precursor compound and preferably the precursor compound is dissolved in the liquid carrier. The liquid carrier may be water.

The impregnation may be effected by any suitable impregnation method, including incipient wetness impregnation or slurry phase impregnation. Slurry phase impregnation is preferred. Preferably, the precursor compound is dissolved in the liquid carrier in order that the volume of the solution is greater than xy liter, which solution is then mixed with the modified catalyst support, and wherein x is the BET pore volume of the modified catalyst support in l/kg support, and y is the mass of modified catalyst support to be impregnated in kg. Preferably the volume of the solution is greater than 1.5xy liter, and preferably it is about 2xy liter.

The impregnation may be carried out at sub-atmospheric pressure, preferably below 85 kPa(a), preferably at 20 kPa(a) and lower. Preferably the impregnation is also carried out at a temperature above 25° C. The impregnation temperature may be above 40° C., preferably above 60° C., but preferably not above 95° C.

The impregnation may be followed by partial drying of the impregnated support, preferably at a temperature above 25° C. The drying temperature may be above 40° C., preferably above 60° C., but preferably not above 95° C. Preferably the partial drying may be effected at sub-atmospheric conditions, preferably below 85 kPa(a), preferably at 20 kPa(a) or lower.

In one embodiment of the invention, the impregnation and partial drying of the modified catalyst support may be carried out using a procedure which includes a first step wherein the modified catalyst support is impregnated (preferably slurry impregnated) with the precursor compound at a temperature above 25° C., and at sub-atmospheric pressure, and the resultant product is dried; and at least one subsequent step wherein the resulting partially dried impregnated modified catalyst support of the first step is subjected to treatment at a temperature above 25° C., and sub-atmospheric pressure such that the temperature of the subsequent step exceeds that in the first step and/or the sub-atmospheric pressure in the subsequent step is lower than that in the first step. This two step impregnation procedure may be as described in WO 00/20116, which is incorporated herein by reference.

A dopant capable of enhancing the reducibility of the active catalyst component may also be introduced onto and/or into the modified catalyst support. The dopant may be introduced during or after the introduction of the precursor compound onto and/or into the modified catalyst support. The dopant may be introduced as a dopant compound which is a compound of a metal selected from the group including palladium (Pd), platinum (Pt), ruthenium (Ru), rhenium (Re) and a mixture of two or more thereof. Preferably, the dopant compound is an inorganic salt, and it is preferably soluble in water. The mass proportion of the metal of the dopant to the active catalyst component metal may be in the ratio of 0.01:100 to 3:100.

The partially dried catalyst support with the precursor compound thereon and/or therein may be calcined. The calcination may be effected in order to decompose the precursor compound and/or causing it to react with oxygen. For example, cobalt nitrate may be converted into a compound selected from $CoO$, $CoO(OH)$, $Co_3O_4$, $Co_2O_3$ or a mixture of two or more thereof.

The calcination may be carried out in any suitable manner such as in a rotary kiln, but preferably it is carried out in a fluidised bed reactor.

The calcination may be carried out in an inert atmosphere, but preferably it is carried out in the presence of oxygen, more preferably in air.

Preferably the calcination is carried out at a temperature above 95° C., more preferably above 120° C., still more preferably above 200° C., but preferably not above 400° C., more preferably not above 300° C. This is especially the case where Co is the active catalyst component.

The calcination may be carried out by using a heating rate and an air space velocity that comply with the following criteria:
  (i) when the heating rate is ≤1° C./min, the air space velocity is at least 0.76 $m_n^3$/(kg $Co(NO_3)_2.6H_2O$)/h; and
  (ii) when the heating rate is higher than 1° C./min, the air space velocity satisfies the relation:

$$\log(\text{space velocity}) \geq \log 0.76 + \frac{\log 20 - \log 0.76}{2} \log(\text{heating rate})$$

The above conditions for air space velocity and heating rate are especially applicable where Co is the active catalyst component.

The impregnation, the partial drying and calcination may be repeated to achieve higher loadings of the precursor compound on the catalyst support. In one embodiment of the invention, a first impregnation, drying and calcination procedure may be followed by a partial reduction procedure of the calcined material; and the partially reduced material may then be subjected to a further impregnation, drying and calcination procedure. The partial reduction procedure may be executed with a final temperature of between 100° C. and 300° C., especially in the case where Co is the active catalyst component.

In one embodiment of the invention, the catalyst precursor may be prepared by a method which includes in a first preparation step, impregnating the modified catalyst support with an organic metal compound of the active catalyst component in a carrier liquid, at least partially drying the impregnated support, and calcining the at least partially dried impregnated support, to obtain a calcined intermediate; and in a second preparation step, impregnating the calcined intermediate from the first impregnation step, with an inorganic metal salt of the active catalyst component in a carrier liquid, at least partially drying the impregnated support, and calcining the at least partially dried impregnated support, to obtain the catalyst precursor. The organic metal compound may be an organic cobalt compound.

The catalyst precursor may have reduced dissolution in an aqueous environment, preferably an acidic aqueous environment.

According to a second aspect of the invention, there is provided a method of preparing a catalyst, which includes preparing a catalyst precursor according to the method of the first aspect of the invention, and reducing the resultant catalyst precursor thereby activating the catalyst precursor and obtaining the catalyst.

The reduction of the catalyst precursor preferably includes treating it with a reducing gas to activate it. Preferably, the reducing gas is hydrogen or a hydrogen containing gas. The hydrogen containing gas may consist of hydrogen and one or more inert gases which are inert in respect of the active catalyst. The hydrogen containing gas preferably contains at least 90 volume % hydrogen.

The reducing gas may be contacted with the catalyst precursor in any suitable manner. Preferably the catalyst precursor is provided in the form of a bed with the reducing gas being caused to flow through the bed of particles. The bed of particles may be a fixed bed, but preferably it is a fluidised bed and preferably the reducing gas acts as the fluidising medium for the bed of catalyst precursor particles.

The reduction may be carried out at a pressure from 0.6 to 1.5 bar(a), preferably from 0.8 to 1.3 bar(a). Alternatively the pressure may be from 1.5 bar(a) to 20 bar(a). Preferably, however, the pressure is at about atmospheric pressure.

The reduction is preferably carried out at a temperature in excess of 25° C. above that at which the catalyst precursor will be reduced to an active form. Preferably, the activation is carried out at a temperature above 150° C., and preferably below 600° C., especially where the active catalyst component is cobalt. Preferably the reduction is carried out at a temperature below 500° C., more preferably below 450° C.

During activation the temperature may be varied, and preferably it is increased to a maximum temperature as set out above.

The flow of the reducing gas through the catalyst bed is preferably controlled to ensure that contaminants produced during reduction are maintained at a sufficiently low level. The reducing gas may be recycled, and preferably the recycled reducing gas is treated to remove one or more contaminants produced during reduction. The contaminants may comprise one or more of water and ammonia.

The activation may be carried out in two or more steps during which one or both of the heating rate and the space velocity of the reducing gas is varied.

In one embodiment of the invention, the active catalyst may be coated by introducing a mixture of active catalyst particles and a coating medium in the form of molten organic substance, which is at a temperature $T_1$, and which sets or congeals at a lower temperature $T_2$ so that $T_2 < T_1$, into at least one mould; and at least partly submerging the mould in a cooling liquid, so as to cool the organic substance down to a temperature $T_3$, where $T_3 \leq T_2$.

During the activation the water partial pressure is preferably kept as low as possible, more preferably below 0.1 atmosphere. The hydrogen space velocity may be from 2 to 4 liters per hour per gram of catalyst.

According to a third aspect of the present invention, there is provided a hydrocarbon synthesis process which comprises preparing a catalyst using the method of the second aspect of the invention; and contacting hydrogen with carbon monoxide at a temperature above 100° C. and a pressure of at least 10 bar with the catalyst so prepared, to produce hydrocarbons and, optionally, oxygenates of hydrocarbons.

The temperature may be from 180° C. to 250° C., more preferably from 210° C. to 240° C. The pressure more preferably may be from 10 bar to 70 bar.

Preferably, the hydrocarbon synthesis process is a Fischer-Tropsch process, more preferably a three phase Fischer-Tropsch process, still more preferably a slurry bed Fischer-Tropsch process for producing a wax product.

The hydrocarbon synthesis process may also include a hydroprocessing step for converting the hydrocarbons and, optionally, oxygenates to liquid fuels and/or chemicals.

The present invention extends also to products when produced by the hydrocarbon synthesis process of the third aspect of the invention.

The invention will now be described in more detail with reference to the following non-limiting examples:

EXAMPLES

General

Gamma alumina Puralox SCCa-2/150 (trademark) was used as a catalyst support material in all the Examples, except Examples 7 and 9, without any further treatment thereof. The $WO_3/Al_2O_3$ composites were prepared by the impregnation of batches of the alumina support with a solution of ammonium metatungstate $[(NH_4)_6W_{12}O_{39} \cdot xH_2O]$ from Aldrich.

Example 1

To a round bottomed flask, 50 ml volume of distilled water and an amount of ammonium metatungstate (targeting: 1.2 wt % W loading based on the total weight of a modified catalyst support formed therefrom—see Example 6) were added and the mixture swirled until all the tungsten salt dissolved. The pH of solution was adjusted to 8 using ammonium hydroxide solution. The flask with the solution was then connected to a rotary evaporator, the solution heated to 60° C. and maintained at 60° C. for about 10 minutes, and thereafter 50 g of alumina support was added to the solution. The impregnation was slowly carried out over a period of 5 h while gradually increasing the vacuum from atmospheric pressure to 80 mbar (a) and maintaining it at 80 mbar(a) until dryness, while the temperature was maintained at 60° C. Thus, a tungsten-containing catalyst support material was obtained.

Example 2

This example was prepared in the same manner as Example 1, except that the W level was 2.4 wt % based on the total weight of a modified catalyst support formed therefrom—see Example 6.

Example 3

This example was prepared in the same manner as Example 1, except that the W level was 4.0 wt % based on the total weight of a modified catalyst support formed therefrom—see Example 6.

Example 4

This example was prepared in the same manner as Example 1, except that the W level was 7.9 wt % based on the total weight of a modified catalyst support formed therefrom—see Example 6.

Example 5

Comparative

This example is simply the unmodified gamma alumina support Puralox SCCa-2/150.

Example 6

The prepared support materials of Examples 1 to 4 were calcined in a muffle oven in ambient air at 500° C. and 700° C. (all comparative) as well as at 920° C. (according to the invention) and 1100° C. (according to the invention). The samples were calcined using a ramping rate of 3.0° C./min to the predetermined temperature, i.e. 500° C., 700° C., 920° C. or 1100° C., and held for 2 h. The unmodified alumina (Example 5) was also calcined in this manner (comparative). Not all supports were necessarily calcined at all temperatures—see Tables 1 and 2. By means of the calcination, the tungsten-containing catalyst support material of each Example was thus converted to a modified catalyst support.

Example 7

A silica modified alumina support, as described in Example 1 of U.S. Pat. No. 6,638,889 was calcined at 500° C., 920° C. and at 1100° C. (comparative). The samples were calcined using a ramping rate of 3.0° C./min to the predetermined temperature and held for 2 h.

Example 8

The W modified supports (derived from Examples 1 to 4 and 6), the Si modified support (Example 7) as well as the unmodified alumina supports (derived from Example 5) were subjected to an Al leaching test (see Table 1). The Al leaching test is described as follows:

A leaching test, which utilized a 1% formic acid solution pumped over a fixed bed containing the support at 60° C., was developed. The solution was circulated over the bed at pH 2 and as the pH increased, additional concentrated formic acid was added to maintain a constant pH. The solution was cooled to 20° C. to protect the pH electrode against a constant high temperature exposure. This continued for 30 minutes after which the aluminium content of the spent solution was analyzed by means of ICP (Inductive Coupled Plasma) analysis.

The BET pore volumes of the samples were determined using standard procedures.

TABLE 1

| | Al leaching (ppm) at different calcination temperatures | | | | |
|---|---|---|---|---|---|
| W level (m %) | 60° C. (comp) | 500° C. (comp) | 700° C. (comp) | 920° C. (invention) | 1100° C. (invention) |
| 0 (Ex 5) (comparative) | 260 | 200 | — | 184 | 94 |
| 1.2 (Ex 1) (invention) | 120 | 175 | 192 | 113 | 81 |
| 2.4 (Ex 2) (invention) | 103 | 145 | 177 | 32 | 29 |
| 4.0 (Ex 3) (invention) | 75 | 120 | 148 | — | 53 |
| 7.9 (Ex 4) (invention) | 59 | 130 | 116 | 116 | 21 |
| Si level (m %) 1.5 (ex 7) (comparative) | — | 145 | — | 220 | 175 |

The BET pore volumes are shown in Table 2

TABLE 2

| | BET Pore volume (ml/g) at different calcination temperatures | | | | |
|---|---|---|---|---|---|
| W level (m %) | 60° C. (comp) | 500° C. (comp) | 700° C. (comp) | 920° C. (invention) | 1100° C. (invention) |
| 0 (Ex 5) (comparative) | | 0.52 | 0.52 | 0.52 | 0.33 |
| 1.2 (Ex 1) (invention) | 0.51 | 0.50 | 0.51 | — | 0.37 |
| 2.4 (Ex 2) (invention) | 0.50 | 0.50 | 0.50 | — | 0.38 |
| 4.0 (Ex 3) (invention) | 0.46 | 0.47 | 0.47 | — | 0.34 |
| 7.9 (Ex 4) (invention) | 0.43 | 0.44 | 0.45 | — | 0.25 |
| Si level (m %) 1.5 (ex 7) (comparative) | — | — | 0.48 | 0.47 | 0.47 (1067° C.) |

Compared to no support modification, the W modification in general decreases the Al leaching of the alumina support, and this can be seen already at 60° C. heat treatment. The leaching of the Si modified support increases when the calcination temperature is increased from 500° C. to 1100° C. When the W supports are calcined at 700° C., the Al leaching generally gets worse compared to heat treatment at 60° C. Surprisingly, however, calcination of the W supports at temperatures in excess of 900° C., for example at 1100° C., decreases the Al leaching dramatically. Al leaching of the W modified alumina calcined at 1100° C. is also better than that of the unmodified alumina and the Si modified alumina calcined at 1100° C.

Example 9

According to Invention

Boehmite was used as starting material in this example. These samples were prepared by adding a 3% ammonium metatungstate $[(NH_4)_6W_{12}O_{39}\cdot xH_2O]$ aqueous solution at pH between 7 and 8 to a Pural (trade mark) alumina slurry and stirred for 3 hours at 50° C., followed by drying at 120° C., spray-drying and calcination (as for Example 6) at the required temperature. Pural alumina (also known as boehmite) is a support precursor. W levels of 1.2 and 2.4 wt % were achieved. The samples were subjected to the same leaching test as in Example 8, and their BET pore volumes were determined using the same procedures as in Example 8.

The Al leaching levels are shown in Table 3 and the BET pore volumes in Table 4.

TABLE 3

| | Al leaching (ppm) at different calcination temperatures | | | | |
|---|---|---|---|---|---|
| W level (m %) | 120° C. (comp) | 500° C. (comp) | 900° C. (comp) | 920° C. (invention) | 1100° C. (invention) |
| 0 (Ex 5) (comparative) | 260 (at 60° C.) | 200 | — | — | 94 |
| 1.2 (Ex 9) (invention) | 178 | | 73 | | 28 |
| 2.4 (Ex 9) (invention) | 219 | | 42 | | 39 |
| Si level (m %) 1.5 (ex 7) (comparative) | | 145 | | 220 | 175 |

TABLE 4

| | BET Pore volume (ml/g) at different calcination temperatures | | | | |
|---|---|---|---|---|---|
| W level (m %) | 120° C. (comp) | 500° C. (comp) | 700° C. (comp) | 920° C. (invention) | 1100° C. (invention) |
| 0 (Ex 5) (comparative) | | 0.52 | 0.52 | 0.52 | 0.33 |
| 1.2 (Ex 9) (invention) | | | | | 0.39 |
| 2.4 (Ex 9) (invention) | | | | | 0.46 |
| Si level (m %) 1.5 (ex 7) (comparative) | — | — | 0.48 | 0.47 | 0.47 (1067° C.) |

Example 10

According to Invention

A cobalt based Fischer-Tropsch synthesis catalyst (example 10; according to the invention) with the composition 22 g Co/0.075 g Pt/100 g Support was prepared on the 2.4 wt % W modified alumina support calcined at 1100° C. (i.e. the support obtained by calcining the support material of Example 2 using the calcination procedure of Example 6, hereinafter also referred to as 'the support of Example 2'). The catalyst was prepared as follows: In a first impregnation stage, $Co(NO_3)_2.6H_2O$ (16.5 g) and $[Pt(NH_4)_4(NO_3)_2]$ (0.0144 g) were dissolved in 30 ml of distilled water. To the mixture, 30 g of the support of Example 2 (calcined at 1100° C.) was added and the water was driven off by adopting the drying profile tabled below (Table 5). Once dry, the sample was calcined at 250° C. using a fluidised bed with a flow of air for 6 hours. Then, in a second impregnation stage, the above steps were repeated using $Co(NO_3)_2.6H_2O$ (14.0 g) and $[Pt(NH_4)_4(NO_3)_2]$ (0.0234 g) dissolved in 30 ml of distilled water, and to which 30 g of the calcined material from the first impregnation stage were added; thereafter, a similar drying profile as tabled in Table 5 below was adopted to dry the sample. The dry material was then calcined at 250° C. for another 6 hours in the same manner as for the first impregnation stage.

TABLE 5

| Pressure/ mbar | Temperature/ ° C. | Duration/ min |
|---|---|---|
| Atm | 60 | 10 |
| 260 | 60 | 30 |
| 260 | 75 | 90 |
| 260 | 85 | 60 |
| 50 | 85 | 180 |

Example 11

Comparative

A cobalt based Fischer-Tropsch synthesis catalyst (example 11; comparative) with the composition 22 g Co/0.075 g Pt/100 g Support was prepared on an unmodified alumina support calcined at 700° C. (i.e. the support from Example 5). The catalyst was prepared in a similar manner to that described in Example 10. However, in the first impregnation step $Co(NO_3)_2.6H_2O$ (27.0 g) and $[Pt(NH_4)_4(NO_3)_2]$ (0.027 g) dissolved in 50 ml of distilled water, were used. To the mixture, 50 g of the unmodified Puralox SCCa 2/150 support (derived from Example 5) was added. A drying profile similar to that tabled above (Table 5 of Example 10) was used and the dried sample was calcined at 250° C. using a fluidised bed column with a flow of air for 6 hours. In a second impregnation step, the above steps were repeated using $Co(NO_3)_2.6H_2O$ (22.5 g) and $[Pt(NH_4)_4(NO_3)_2]$ (0.040 g) dissolved in 50 ml of distilled water, and to which 50 g of the calcined material from the first impregnation step were added. A similar drying profile as tabled in Table 5 of Example 10 was adopted to dry the sample.

The dried material was again then calcined at 250° C. for another 6 hours in the same manner as for the first impregnation stage.

Example 12

Fischer-Tropsch synthesis testing was done as follows:
Experimental conditions in a fixed bed reactor:
Clean syngas with $H_2$/CO-ratio=1.63±0.05
CO pressure: 3.8±0.2 bar
$H_2$ pressure outlet: 4.0±0.4 bar
$H_2O$ pressure outlet: 4.5±0.3 bar
Temperature: 230° C.
Pressures: 17.2±0.5 bar
CO conversion (%)=20-30
The FT performance after 144 hours is summarized in Table 6:

TABLE 6

| | Activity (relative to example 11) | CH4 selectivity (C-atom %) |
|---|---|---|
| Cat Example 10 (invention) | 1.47 | 6.2 |
| Cat Example 11 (comparative) | 1.00 | 7.3 |

It can be seen from Table 6 that the FT performance of the catalyst on the W modified support and calcined at 1100° C. (Example 10; according to the invention) is higher than the FT performance of the catalyst on the unmodified alumina calcined at 700° C. (Example 11; comparative) with the same Co loading.

Example 13

According to Invention

Puralox SCCa 2/150 was dispersed in deionised water at room temperature (RT). Then a solution of ammonium metatungstate in water (0.8 m % W) was added at RT, so that a total W content of 2.7 wt % based on the total weight of a modified catalyst support formed therefrom (see hereunder) was achieved. Then the flask was gradually heated up to 50° C. and stirred for three hours. The product was filtered and dried in a drying cabinet for 15 hours at 120° C. The samples were subjected to the same leaching test as in Example 8 (see Table 7). The sample was calcined at 1100° C. to obtain a modified catalyst support.

TABLE 7

| W level (m %) | Al leaching (ppm) at different calcination temperatures | | | | |
|---|---|---|---|---|---|
| | 120° C. (comp) | 500° C. (comp) | 900° C. (comp) | 920° C. (invention) | 1100° C. (invention) |
| 0 (Ex 5) (comparative) | 260(at 60° C.) | 200 | — | — | 94 |
| 2.7 (Ex 13) (invention) | 67 | — | — | — | 26 |
| 2.7 (Ex 14) (invention) | 107 | — | — | — | 35 |

Example 14

According to Invention

Puralox SCCa 2/150 was dispersed in deionised water at room temperature (RT). Then a solution of ammonium paratungstate in water (0.8 m % W) at a pH of 8.0 was added at RT, so that a total W content of 2.7 wt % based on the total weight of a modified catalyst support formed therefrom (see hereunder) was achieved. Then the flask was gradually heated up to 50° C. and stirred for three hours. The product was filtered and dried in a drying cabinet for 15 hours at 120° C. The sample was calcined at 1100° C. to obtain a modified catalyst support. Both dried and calcined samples were subjected to the same leaching test as in Example 8 (see Table 7).

Example 15

Comparative

A cobalt based Fischer-Tropsch synthesis catalyst with the composition 30 g Co/0.075 g Pt/100 g Support was prepared on a silica modified alumina support calcined at 500° C. (i.e. the support from Example 7). The catalyst was prepared in a similar manner to that described in Example 10. However, the amounts of $Co(NO_3)_2 \cdot 6H_2O$ and $Pt(NH_4)_4(NO_3)_2$ were adjusted to get a catalyst composition of 30 g Co/0.075 g Pt/100 g Support.

Example 16

The catalysts prepared on a W modified support (Example 10; inventive), and prepared on a Si modified support (Example 15; comparative) were subjected to the Al leaching test, as described in Example 8 (see Table 8).

As can be seen from Table 8, catalysts prepared on W modified supports that are calcined in excess of 900° C. have much less Al leaching than catalysts that have not been prepared on a W containing support.

TABLE 8

| Catalyst | Al leaching (ppm) |
|---|---|
| Example 15 (comparative) 0 W | 76 |
| Example 10 (invention) 2.4 W | 23 |

It can thus be concluded that a catalyst according to the invention can be prepared on a W modified support calcined in excess of 900° C. with a good FT performance and with a surprisingly excellent resistance towards Al leaching.

The invention claimed is:

1. A method of preparing a catalyst precursor, the method comprising
   contacting a catalyst support material with a tungsten compound, to obtain a tungsten-containing catalyst support material;
   calcining the tungsten-containing catalyst support material at a temperature above 900° C. to obtain a modified catalyst support, wherein sufficient of the tungsten compound is used such that it is present in and on the catalyst support material in an amount of not more than 12 wt % W based on the total weight of the modified catalyst support; and
   introducing a precursor compound of an active catalyst component selected from the group consisting of cobalt (Co), iron (Fe) and nickel (Ni) onto and/or into the modified catalyst support thereby to obtain a catalyst precursor.

2. The method according to claim 1 wherein, by contacting the catalyst support material with the tungsten compound, the tungsten compound is introduced onto and/or into the catalyst support material, with the catalyst support material being a catalyst support.

3. The method according to claim 1, wherein the tungsten compound comprises a tungsten oxide.

4. The method according to claim 3, wherein the tungsten compound includes a monotungstate ion $[WO_4]^{2-}$ or a polyoxo tungstate ion in the form of a metatungstate ion $[W_{12}O_{40}]^{4-}$ or a paratungstate ion $[W_{12}O_{42}]^{6-}$.

5. The method according to claim 1, wherein the tungsten compound is ammonium metatungstate $(NH_4)_6 H_2W_{12}O_{39} \cdot xH_2O$ or ammonium paratungstate $(NH_4)_{10}(H_2W_{12}O_{41}) \cdot xH_2O$.

6. The method according to claim 1, wherein sufficient of the tungsten compound is used such that it is present in and on the catalyst support material in an amount of at least 0.4 wt % W based on the total weight of the modified catalyst support.

7. The method according to claim 1, wherein sufficient of the tungsten compound is used such that it is present in and on the catalyst support material in an amount of about 2.4 wt % W based on the total weight of the modified catalyst support.

8. The method according to claim 1, wherein the contacting of the catalyst support material with the tungsten compound is by means of impregnation, using an inorganic liquid medium that is a solvent for the tungsten compound.

9. The method according to claim 8, wherein the impregnation by means of the liquid medium is preferably carried out at a pH above 4 and below 10.

10. The method according to claim 8, wherein the impregnation by means of the liquid medium is carried out at a temperature above 25° C. and below 80° C.

11. The method according to claim 8, wherein the impregnation by means of the liquid medium is carried out for a period of at least 1 minute and not more than 20 hours.

12. The method according to claim 8, wherein excess inorganic liquid medium is removed by means of drying at sub-atmospheric conditions of at least 0.01 bar(a) and not more than 0.1 bar(a).

13. The method according to claim 1, wherein the calcination of the tungsten-containing catalyst support material is carried out at a temperature in excess of 1000° C.

14. The method according to claim 13, wherein the pore volume of the modified catalyst support is greater than 0.35 ml/g.

15. A method of preparing a catalyst, which includes preparing a catalyst precursor according to the method of claim 1; and reducing the resultant catalyst precursor, thereby activating the catalyst precursor and obtaining the catalyst.

16. A hydrocarbon synthesis process which comprises preparing a catalyst using the method of claim 15; and contacting hydrogen with carbon monoxide at a temperature above 100° C. and a pressure of at least 10 bar with the catalyst so prepared, to produce hydrocarbons and, optionally, oxygenates of hydrocarbons.

* * * * *